United States Patent
Perkins et al.

[11] Patent Number: 6,011,117
[45] Date of Patent: Jan. 4, 2000

[54] HIGH GLOSS, HIGH IMPACT POLYSTYRENE COMPOSITION

[75] Inventors: Holly L. Perkins; Raymond W. Wilson, Sr., both of Southgate, Mich.

[73] Assignee: BASF Corporation, Mt. Olive, N.J.

[21] Appl. No.: 08/795,480

[22] Filed: Feb. 11, 1997

[51] Int. Cl.[7] ............................ C08L 53/02; C08L 51/04
[52] U.S. Cl. ........................ 525/99; 525/87; 525/95; 525/198
[58] Field of Search .................. 525/87, 99, 198, 525/95

[56] References Cited

U.S. PATENT DOCUMENTS

| | | |
|---|---|---|
| 3,903,202 | 9/1975 | Carter et al. . |
| 3,906,058 | 9/1975 | Durst . |
| 3,907,931 | 9/1975 | Durst . |
| 4,073,831 | 2/1978 | Tabana et al. . |
| 4,075,285 | 2/1978 | Tabana et al. ............... 525/99 X |
| 4,146,589 | 3/1979 | Dupre . |
| 4,195,136 | 3/1980 | Sato et al. . |
| 4,239,859 | 12/1980 | Miller . |
| 4,245,057 | 1/1981 | Slama . |
| 4,294,937 | 10/1981 | Whitehead . |
| 4,334,039 | 6/1982 | Dupre . |
| 4,421,883 | 12/1983 | Cooper et al. . |
| 4,493,922 | 1/1985 | Echte et al. . |
| 4,593,063 | 6/1986 | Jones et al. . |
| 5,039,714 | 8/1991 | Kasahara et al. . |
| 5,252,664 | 10/1993 | Thompson et al. ............ 525/87 X |
| 5,294,656 | 3/1994 | Okamoto et al. . |
| 5,334,658 | 8/1994 | Blumenstein et al. . |
| 5,380,798 | 1/1995 | Onishi et al. . |
| 5,385,781 | 1/1995 | Chundury et al. . |
| 5,428,106 | 6/1995 | Schrader et al. . |
| 5,473,014 | 12/1995 | Ando et al. . |
| 5,633,318 | 5/1997 | Bowen ........................ 525/99 X |

FOREIGN PATENT DOCUMENTS

| | | |
|---|---|---|
| 582 349 A1 | 2/1994 | European Pat. Off. . |
| 590 965 A1 | 4/1994 | European Pat. Off. . |
| 732 345 A1 | 9/1996 | European Pat. Off. . |
| S55-161837 | 12/1980 | Japan . |
| S57-67644 | 4/1982 | Japan . |
| S58-180544 | 10/1983 | Japan . |
| S63-230754 | 4/1988 | Japan . |
| 08 048 842 | 2/1996 | Japan . |
| 08 244 179 | 9/1996 | Japan . |
| 2 299 091 | 4/1996 | United Kingdom . |
| 2 298 426 | 9/1996 | United Kingdom . |
| WO 96/17016 | 6/1996 | WIPO . |

OTHER PUBLICATIONS

Article "The Theory of Rubber Toughening of Brittle Polymers", Author C.G. Bragaw, Advances In Chemistry Series 99, American Chemical Society, Washington, D.C. 1971.

*Primary Examiner*—Fred Teskin
*Attorney, Agent, or Firm*—James J. Drake; Fernando A. Borrego

[57] ABSTRACT

Disclosed are compositions having as the polymeric component a blend of from about 55 to about 85% by weight of a rubber modified polystyrene and from about 45 to about 15% by weight of at least one thermoplastic styrenic block copolymer. The thermoplastic styrenic block copolymer has a styrene content of at least about 70% by weight.

27 Claims, No Drawings

HIGH GLOSS, HIGH IMPACT POLYSTYRENE COMPOSITION

FIELD OF THE INVENTION

The present invention relates to high impact, high gloss polystyrene compositions used for forming articles, and especially to compositions containing a cis-polybutadiene-based rubber-modified polystyrene blended with a thermoplastic styrenic block copolymer, the block copolymer having a styrene content of at least about 70% by weight.

BACKGROUND AND SUMMARY OF THE INVENTION

High impact modified polystyrene (sometimes abbreviated as HIPS) is a commercially important commodity used for forming articles in, for example, extrusion molding, compression molding, injection molding, and thermoforming operations to produce articles for which toughness and strength are required. Super high impact polystyrene (SHIPS) materials have been introduced. A SHIPS material will have an impact strength of at least about 3 foot-pounds per square inch as measured by notched Izod impact or about 250 inch-pounds as measured by Gardner impact.

While the impact strength is important in such articles, it is often desirable to be able to form an article that also has high surface gloss. Heretofore, it has been difficult to economically produce such impact-modified, high gloss polystyrene compositions because increased impact strength in rubber modified polystyrene materials has been accompanied by decreased surface gloss. For instance, it is known that increased rubber particle size increases the Notched Izod impact strength of the HIPS. Increased rubber particle size, however, has been observed to decrease the gloss surface in articles formed from HIPS.

One solution to the problem of how to obtain high impact strength, high gloss compositions has been to blend together two HIPS resin, for example one with particle diameters below one micron and one with particle diameters above about 1 or 2 microns. Such compositions are described, for example, in U.S. Pat. Nos. 4,146,589; 4,334,039; 4,421,883; 4,493,922; 5,039,714; and 5,295,656, each of which is incorporated herein by reference, as well as in other publications, such as *Styrene Polymers,* in 16 *Encyclopedia of Polymer Science and Technology* 42–45 (H. F. Mark et al. eds., 2d ed. 1987) and Bragaw, *The Theory of Rubber Toughening of Brittle Polymers, in Multi-Component Polymer Systems* (American Chemical Society Advances in Chemistry Series No. 99, 1971), the disclosures and internal references of which are incorporated herein by reference. However, it would be desirable to increase the impact strength of these blends still further.

It is also known that general purpose polystyrene (that is, polystyrene that is not impact modified) can be blended with styrene block copolymers to improve clarity and haze characteristics and to increase the impact values of the general purpose polystyrene, as is disclosed in U.S. Pat. Nos. 3,906,058; 3,907,931; 4,195,136; 4,239,859; and 4,593,063, each of which is incorporated herein by reference. These blends do not, however, have the same high impact strength of HIPS and SHIPS polystyrene compositions. Whereas the HIPS and SHIPS materials have discrete rubber particles that can affect craze initiation and craze or crack propagation in an impact, the blends of general purpose polystyrene and styrene block copolymer rubbers have some compatibility with one another that prevent formation of small, discrete particulate rubber domains. Thus, typical HIPS and SHIPS materials can have impact values that are about an order of magnitude higher than typical polystyrene-rubber blends.

We have now discovered that polystyrene materials with high notched Izod impact, high Gardner dart impact, and high part surface gloss at 60° may be made by blending together (A) a polybutadiene and/or polybutadiene-based rubber-modified polystyrene polymer with (B) at least one thermoplastic styrenic block copolymer with a styrene content of at least about 70% by weight, based upon the weight of the block copolymer.

DETAILED DESCRIPTION

The compositions of the invention comprise both (A) a polystyrene polymer and (B) a thermoplastic styrenic block copolymer. The polystyrene polymer (A) is a rubber-modified polystyrene, such as a HIPS or a SHIPS material. Suitable rubbers for modifying the polystyrene are natural rubber, polybutadiene and its copolymers with styrene or other comonomers, polyisoprene and its copolymers with styrene or other comonomers, acrylic rubbers, EPDM rubbers, polybutylene, and so on. The rubber used to modify the polystyrene should have a glass transition temperature of less than about −20° C. The rubber or elastomer used to modify the polystyrene is preferably a polybutadiene rubber or a polybutadiene-based rubber in which the butadiene is from 25 to 99% by weight of the 1,4-cis compound.

In a preferred embodiment, the rubber or elastomer that is used as the modifier in polystyrene (A) is a high-cis polybutadiene rubber or high-cis polybutadiene-based rubber. A high-cis polybutadiene is typically characterized as having a cis-isomer content of from about 97 to about 98% by weight, a trans-isomer content of from zero to about 1% by weight, and a vinyl content of from about 1 to about 2% by weight. It is also possible to prepare the rubber-modified polystyrene material using styrene-butadiene diblock copolymers or styrene-butadiene triblock copolymers, individually or in combination with each other, or with the polybutadiene rubber. In each case, the butadiene block of the modifying elastomer or rubber is preferably a high-cis polybutadiene.

High impact polystyrene that may be used as the polystyrene polymer (A) may be formed as an in situ polymer graft. The resultant material is a two-phase blend in which the rubber, which may be polybutadiene or a butadiene-based copolymer, is dispersed in small particles in a continuous matrix of polystyrene. During the polymerization, the rubber particles are grafted to the polystyrene matrix by reaction of the unsaturation remaining in the rubber after polymerization. The rubber phase may contain occlusions of polystyrene particles. The impact strength of HIPS increases generally with increasing volume of the rubber phase. The volume of the rubber phase may be increased by increasing rubber content or, at a specified rubber content, by occlusions of polystyrene in the rubber particles. In at least one preferred embodiment of the present invention, the rubber particles contain such occlusions of polystyrene. Preferably, the volume of the rubber phase is from about 9 to about 13% of the volume of the rubber-modified polystyrene, more preferably from about 10 to about 12% of the volume of the rubber-modified polystyrene (A), and even more preferably about 11% of the volume of the rubber-modified polystyrene (A).

The rubber particle distribution of the rubber or elastomer in the polystyrene matrix is preferably unimodal. The average rubber particle size may range from about 1 to about 2.5 microns in size, preferably from about 1 to about 2 microns in size, and most preferably from about 1.5 to about 2.0 microns in size. In at least one embodiment of the invention, the optimum average rubber particle size is about 1.7 microns. Compositions having an average rubber particle size of less than about 1 micron are avoided because of poorer impact strength. The particle size of the rubber particles may be controlled by the particular applied shear rate, heat, pressure, or a combination of these factors, during the stage of inversion of the polymerization when polystyrene becomes the continuous phase. Shear agitation is thought to be necessary in order to cause the phase inversion at all.

The impact modified polystyrene preferably has a weight average molecular weight, as measured against a polystyrene standard, of from about 150,000 to about 250,000. Other parameters, such a melt flow rate or Vicat softening temperature, may be important when the polystyrene material of the invention is used in some molding or thermoforming processes. Such parameters may be adjusted or controlled, at least to some extent, according to known methods. For example, mineral oil may be added to the impact modified polystyrene, if desired, to increase the melt-flow ratio for use in injection molding processes.

The rubber-modified polystyrene (A) of the invention may be produced by known processes, for example, according to the methods described in U.S. Pat. No. 3,903,202 and U.S. Pat. No. 4,146,589, incorporated herein by reference. Generally, a solution of from about 4 to about 14% by weight, preferably from about 6 to about 10% by weight, even more preferably from about 8 to about 10% by weight, of the rubber in styrene is polymerized using a suitable initiator system. The reaction may be carried out in either stratifier or backmixed reactors. During the polymerization, the styrene is grafted to the rubber. The grafting is thought to be necessary to provide the higher modulus and impact strength, as compared to simple blends of polystyrene and butadiene rubbers. During the latter stages of polymerization, a temperature increase may cause crosslinking of the rubber particles. If crosslinked, the rubber particles are not changed by later blending or molding operations. The polystyrene (A) of the invention preferably contains rubber particles that have at least some crosslinking. Preparative methods for HIPS- and SHIPS-type materials having rubber particles that are at least partly crosslinked are known in the art, and discussed, for example, in the references incorporated herein.

Suitable impact modified polystyrene materials are commercially available. Preferred among the commercial products are ES 5220, ES 5350, ES 5354, ES 5224, and ES 5400, all available from BASF Corporation, 3000 Continental Drive North, Mt. Olive, N.J. 07828.

The rubber modified polystyrene (A) is blended with a thermoplastic styrenic block copolymer (B). The styrenic block copolymer (B) has a styrene content of at least about 70% by weight and more preferably from about 70 to about 90% by weight, and even more preferably from about 70 to about 85% by weight. In at least some highly preferred embodiments, styrenic block copolymers having a styrene content of from about 70 to about 80% by weight, and especially from about 75 to about 80% by weight, are employed. The styrenic block copolymers are preferably clear and/or transparent in appearance.

The styrenic thermoplastic block copolymers (B) used in the blends of the invention preferably have at least three blocks, wherein at least two but less than all of the blocks are styrene blocks. Thus, blends with both styrene-rubber-styrene linear triblock copolymers and styrene-rubber star-block copolymers are contemplated. Triblock and star-block polymers are known in the art, and are described, for example, in Gerard Riess, G. Hurtrez, and P. Bahadur, *Block Copolymers,* 2 *Encyclopedia of Polymer Science and Engineering,* 324 (H. F. Mark et al. eds., 1985), incorporated herein by reference. Linear block styrene-rubber-styrene copolymers and star block styrene-rubber copolymers having at least four styrene blocks are preferred.

The midblock rubber may be selected from polybutadiene, polyisoprene, hydrogenated polybutadiene, hydrogenated polyisoprene, poly(ethylene-butylene), and other polymers of similar vinyl monomers and mixtures thereof. Styrene-butadiene-styrene linear block copolymers and star block copolymers are particularly preferred.

The preferred butadiene-styrene block copolymers used in the blends of the invention may be in the form of mineral oil-extended grades. The optimum amount of mineral oil added to the block copolymer will vary according to the particular application and may be determined by straightforward optimization according to methods well-known in the art.

Preparative methods for styrene-rubber-styrene block copolymers (B) are known. The particular synthetic method used to prepare the block copolymer (B) is not critical. Polymerization may be carried out, for example, using an alkyllithium compounds. Block copolymers may be formed using such lithium-based anionic initiator systems by adding the monomers in increments in the order of styrene, then butadiene, then styrene for a monofunctional initiator, or by addition of butadiene and then styrene for a difunctional initiator. The block copolymers (B) may be either pure block copolymers or tapered (overlap) copolymers. Tapered copolymers have an area of the polymer between the styrene and rubber blocks in which both monomer units are present. The taper area is thought to exhibit a gradient, from a styrene-rich area closest to the styrene block to a rubber-rich area closest to the rubber block. Pure block and tapered block copolymers are described in Riess et al., supra. In a preferred embodiment of the invention, a tapered styrenic block copolymer (B) is employed.

The cis-butadiene or cis-butadiene-based rubber modified polystyrene (A) and the styrene-butadiene-styrene block copolymer (B) are blended together in a ratio of from about 55 weight percent to about 85 weight percent of impact modified polystyrene to from about 45 weight percent to about 15 weight percent of the styrene block copolymer. Preferably, the impact modified polystyrene is from about 70% to about 85%, and most preferably from about 75% to about 80%, by weight of the combined weights of impact modified polystyrene and styrene block copolymer in the blends of the invention. Linear styrene block copolymer is preferably from about 15% to about 30%, and most preferably about 25%, by weight of the combined weights of impact modified polystyrene and the linear styrene block copolymer. Star-shaped styrene block copolymer is preferably from about 15% to about 40%, and most preferably about 35%, by weight of the combined weights of impact modified polystyrene and the star-shaped styrene block copolymer. Blends having both linear and star-shaped styrene block copolymers are also possible.

The high impact modified polystyrene (A) and the styrenic thermoplastic block copolymer (B) may be blended together, or compounded, in any manner that assures a homogenous intermixture of the two materials. For example, and without any limitation, polymer blends may be prepared by melt mixing in a single- or twin-screw extruder, continuous melt blending, or by calendering. Blending can be carried out in the same equipment being used to produce the final article, e.g., in a screw-type extruder. In this case, for example, pellets of impact modified polystyrene and pellets of the styrene butadiene block copolymer are dry blended and then melt-blended during processing in the extruder that is to produce the desired molded article. Alternatively, the blend may be produced as pellets for later thermoforming by, for example, melt mixing or extrusion molding techniques. Compounding and pelletizing may be done by any of various means known in the art.

The blend compositions of the invention may further include minor amounts of general purpose polystyrene or other polymeric materials. For example, up to about 10%, preferably about 5%, by weight of general purpose polystyrene may be included in the blends of the invention.

The blend compositions of the invention may further include customary ingredients and additives, such as pigments, colorants, plasticizers, mold release agents, stabilizers, ultraviolet light absorbers, and so on. Typical pigments include, without limitation, inorganic pigments such as carbon black, zinc oxide, titanium dioxide, and iron oxide; as well as organic pigments such as quinacridone reds and violets and copper phthalocyanine blues and greens. Pigments may be added to one or both of the rubber modified polystyrene or the styrene thermoplastic block copolymer, or separately to the mixture when the blend is formed. Pigments are usually added in the form of color concentrates, liquid dispersions, or powders.

The blends of the invention may be processed by means of injection molding, compression molding, and extrusion molding techniques. Molding conditions may be the same as conditions usually employed for molding impact modified polystyrenes. Molding conditions for particular blends and equipment may be optimized by straightforward testing according to the usual methods. It is preferred that shear heat is minimized during processing in order to avoid a chance of surface haze in the finished article. Thus, extrusion methods may be preferred to injection molding methods for some blends. Alternatively, lower viscosity blends may be made when injection molding is intended, for instance by including mineral oil in appropriate amounts.

The blend compositions of the invention maintain their physical properties across a range of molding conditions including ranges in melt temperature, mold temperature, injection speed, and injection pressure. The blends of the invention also exhibit excellent heat history and regrind stability.

The blends of rubber modified polystyrene (A) and styrenic block copolymer (B) of the invention are useful for forming many different kinds of articles for which it is desirable to have both high impact resistance and high gloss. For example, and without limitation, the present blends are useful for forming refrigerator components such as pans, drawers, door components, and egg trays; housing for vacuums, blenders, and other small appliances; and medical devices, such as nebulizers.

The invention is illustrated by the following examples. The examples are merely illustrative and do not in any way limit the scope of the invention as described and claimed. All parts are parts by weight unless otherwise noted.

EXAMPLES

Example 1

ES5350, a super high impact extrusion grade polystyrene available from BASF Corporation, 3000 Continental Drive North, Mt. Olive, N.J., 07828, was blended with the indicated wt. % of the indicated styrene-butadiene-styrene block copolymers and tested for physical strength and gloss. STYROLUX® 648D is a star-shaped, tapered styrene-butadiene-styrene block copolymer also available from BASF Corporation. FINACLEAR® 520 is a linear, tapered styrene-butadiene-styrene block copolymer available from Fina Chemical, Dallas, Tex.

|  | Example 1A | Example 1B | Example 1C | Comparative Example 1D (all ES5350) |
|---|---|---|---|---|
| Block copolymer | 25 wt. % FINACLEAR ® 520 | 25 wt. % STYROLUX ® 684D | 20 wt. % 684D | none |
| Notched Izod Impact, ASTM D256 (ft-lb./in²) | 6.4 | 4.7 | 4.5 | 3.5 |
| Gardner Impact, ASTM D3029 (in-lb) | >400 | >400 | >400 | 340 |
| Tensile Yield, ASTM D638 (psi) | 3840 | 3830 | 3730 | 3780 |
| Tensile Break, ASTM D638 (psi) | 3640 | 3710 | 3640 | 3730 |
| Tensile Modulus, ASTM D638 (kpsi) | 187 | 216 | 207 | 205 |
| Elongation at Break, ASTM D638 (%) | 89 | 65 | 59 | 48 |
| Vicat softening temp., ASTM D1525 (° C.) | 102 | 102 | 103 | 105 |
| Gardner Gloss at 60°, ASTM D523 | 100 | 95 | 93 | 78 |

Example 2

Samples that include other high cis rubber modified polystyrene materials were prepared by blending together the high cis rubber modified polystyrene with 25% of an SBS block copolymer. ES5220 is a super high impact polystyrene available from BASF Corporation, 3000 Continental Drive North, Mt. Olive, N.J., 07828. PS4100 is a high-cis rubber modified polystyrene available from BASF Corporation. STYROLUX® 648D is a star-shaped, tapered styrene-butadiene-styrene block copolymer also available from BASF Corporation. FINACLEAR® 520 is a linear, tapered styrene-butadiene-styrene block copolymer available from Fina Chemical, Dallas, Tex.

|  | Example 2A | Example 2B |
|---|---|---|
| SHIPS | PS4100 | ES5220 |
| Type of SBS rubber | STYROLUX ® 684D | FINACLEAR ® 520 |
| Amount of SBS rubber (wt. %) | 25 | 25 |
| Notched Izod Impact, ASTM D256 (ft-lb./in$^2$) | 3.3 | 6.8 |
| Gardner Impact, ASTM D3029 (in-lb) | >400 | >400 |

-continued

|  | Example 2A | Example 2B |
|---|---|---|
| Tensile Yield, ASTM D638 (psi) | 3700 | 3020 |
| Tensile Break, ASTM D638 (psi) | 3660 | 3120 |
| Tensile Modulus, ASTM D638 (kpsi) | 207 | 187.4 |
| Elongation at Break, ASTM D638 (%) | 49 | 70 |
| Vicat softening temp., ASTM D1525 (° C.) | 102 | 99 |
| Gardner Gloss at 60°, ASTM D523 | 99 | 97 |

Example 3

Samples that include a high cis rubber modified polystyrene, a general purpose polystyrene, and an SBS rubber were prepared by blending together the materials in the weight percentages indicated. ES5220 is a super high impact polystyrene available from BASF Corporation, 3000 Continental Drive North, Mt. Olive, N.J., 07828. STYROLUX® 648D is a star-shaped, tapered styrene-butadiene-styrene block copolymer also available from BASF Corporation. FINACLEAR® 520 is a linear, tapered styrene-butadiene-styrene block copolymer available from Fina Chemical, Dallas, Tex. KR01 and KR04 are styrene-butadiene-styrene block copolymers available from Phillips Chemical Co., Bartlesville, Okla. STEREON® 840 is a styrene-butadiene-styrene block copolymer available from Firestone Synthetic Rubber & Latex Co., Akron, Ohio. KRATON® D1101 is a styrene-butadiene-styrene block copolymer available from Shell Chemical Co., Houston, Tex. PS1800 is a general purpose (i.e., unmodified) polystyrene available from BASF Corporation.

|  | Example 3A | Example 3B | Example 3C | Example 3D | Comparative Example 3E | Comparative Example 3F | Comparative Example 3G |
|---|---|---|---|---|---|---|---|
| SHIPS, wt. % | 70% | 75% | 75% | 75% | 100 | 75% | 75% |
| SBS copolymer, type and wt. % | 25% STYROLUX ® 684D | 20% FINACLEAR ® 520 | 20% KR01 | 20% KR04 | — | 20% STEREON ® 840 | 20% KRATON ® D1101 |
| Styrene content of SBS copolymer, wt. % | 78 | 73 | 84 | 77 | — | 57 | 30 |
| GPPS, wt. % | 5% | 5% | 5% | 5% | — | 5% | 5% |
| Notched Izod Impact, ASTM D256 (ft-lb./in$^2$) | 4.5 | 5.4 | 3.5 | 4.2 | 4.3 | 8.9 | 8.7 |
| Gardner Impact, ASTM D3029 (in-lb) | >400 | >400 | >400 | >400 | 350 | 280 | 320 |
| Tensile Yield, ASTM D638 (psi) | 3170 | 3030 | 3150 | 3090 | 2880 | 2100 | 2410 |
| Tensile Break, ASTM D638 (psi) | 3270 | 3200 | 3300 | 3250 | 3130 | 2370 | 2540 |
| Tensile Modulus, ASTM D638 (kpsi) | 197 | 193 | 195 | 197 | 211 | 155 | 174 |
| Elongation at Break, ASTM D638 (%) | 59 | 64 | 57 | 52 | 56 | 53 | 50 |
| Vicat softening temp., ASTM D1525 (° C.) | 100 | 100 | 102 | 101 | 99 | 97 | 101 |
| Gardner Gloss at 60°, ASTM D523 | 92 | 95 | 91 | 91 | 64 | 87 | 82 |
| Surface Appearance | glossy | glossy | glossy | glossy | dull | uneven, mottled | uneven, mottled |

The results in the above table show that the styrene-butadiene-styrene block copolymer/SHIPS blends that are outside of the present invention have dull and/or mottled appearances, as well as lower drop impact (Gardener impact) and tensile strength values.

The invention has been described in detail with reference to preferred embodiments thereof. It should be understood, however, that variations and modifications can be made within the spirit and scope of the invention and of the following claims.

What is claimed is:

1. A composition comprising as the polymeric component a blend of
    (A) from about 55 to about 85% by weight of a rubber modified polystyrene wherein the rubber is selected from the group consisting of high-cis polybutadiene rubbers and high-cis polybutadiene-based rubbers; and
    (B) from about 45 to about 15% by weight of at least one thermoplastic styrenic block copolymer having a styrene content of at least 70% by weight.

2. A composition according to claim 1, wherein the rubber modified polystyrene has a rubber particle size range of from about 1 micron to about 2.5 microns.

3. A composition according to claim 1, wherein the rubber modified polystyrene has a rubber particle size range of from about 1 micron to about 2 microns.

4. A composition according to claim 1, wherein the rubber modified polystyrene has a rubber particle size range of from about 1.5 microns to about 2.0 microns.

5. A composition according to claim 1, wherein the rubber modified polystyrene contains from about 4 to about 14% by weight of rubber.

6. A composition according to claim 1, wherein the rubber modified polystyrene contains from about 6 to about 10% by weight of rubber.

7. A composition according to claim 1, wherein the rubber modified polystyrene contains from about 8 to about 10% by weight of rubber.

8. A composition according to claim 1, wherein the rubber modified polystyrene contains crosslinked rubber particles.

9. A composition according to claim 1, wherein the rubber is a high-cis polybutadiene rubber.

10. A composition according to claim 1, wherein the rubber is a high-cis polybutadiene-based rubber.

11. A composition according to claim 1, wherein the rubber modified polystyrene has a weight average molecular weight of from about 150,000 to about 250,000.

12. A composition according to claim 1, wherein the thermoplastic styrenic block copolymer is a styrene-butadiene-styrene linear block copolymer.

13. A composition according to claim 1, wherein the thermoplastic styrenic block copolymer is a styrene-butadiene-styrene star block copolymer.

14. A composition according to claim 1, wherein the thermoplastic styrenic block copolymer is a pure block copolymer.

15. A composition according to claim 1, wherein the thermoplastic styrenic block copolymer is a tapered block copolymer.

16. A composition according to claim 1, having from about 70 to about 85% by weight of the rubber modified polystyrene.

17. A composition according to claim 1, having from about 75 to about 80% by weight of the rubber modified polystyrene.

18. A composition according to claim 1, having from about 15 to about 30% by weight of a styrene-butadiene-styrene linear block copolymer.

19. A composition according to claim 1, having from about 15 to about 40% by weight of a styrene-butadiene-styrene star block copolymer.

20. A composition according to claim 1, further including at least one pigment.

21. A composition according to claim 1, further including a polystyrene that has not been rubber modified.

22. A composition according to claim 1, wherein the thermoplastic styrenic block copolymer has a styrene content of from 70 to about 90% by weight.

23. A composition according to claim 1, wherein the thermoplastic styrenic block copolymer has a styrene content of from 70 to about 80% by weight.

24. A method of forming an article, comprising the steps of:
   a. dry blending pellets of a rubber modified polystyrene, wherein the rubber is selected from high-cis polybutadiene rubbers and high-cis polybutadiene-based rubbers, with pellets of a thermoplastic styrenic block copolymer having a styrene content of at least 70% by weight to form a composition comprising as the polymeric component from about 55 to about 85% by weight of rubber modified polystyrene and from about 45 to about 15% by weight of thermoplastic styrenic block copolymer;
   b. loading the dry blend into molding equipment selected from extrusion molds, compression molds, and injection molds; and
   c. forming an article from the dry blend.

25. A method of forming an article, comprising the steps of:
   a. melt blending a rubber modified polystyrene, wherein the rubber is selected from high-cis polybutadiene rubbers and high-cis polybutadiene-based rubbers with a thermoplastic styrenic block copolymer having a styrene content of at least 70% by weight to form a composition comprising as the polymeric component from about 55 to about 85% by weight of rubber modified polystyrene and from about 45 to about 15% by weight of thermoplastic styrenic block copolymer;
   b. forming pellets from the melt-blended composition;
   c. loading the pellets into molding equipment selected from extrusion molding equipment, compression molding equipment, and injection molding equipment; and
   d. molding an article from the pellets.

26. An article formed according to the process of claim 24.

27. An article formed according to the process of claim 25.

* * * * *